(12) United States Patent
Wadding et al.

(10) Patent No.: US 7,346,416 B2
(45) Date of Patent: Mar. 18, 2008

(54) CONTACT LENS MANUFACTURE

(75) Inventors: John Wadding, Tramore (IE); Robert G. Duggan, Piltown (IE); Trevor F. O'Neill, Tramore (IE); David Sheppard, Tramore (IE); Gabriel Philip Kennedy, Tramore (IE); Michael W. Murphy, Woodstown Upper (IE)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 10/540,082

(22) PCT Filed: Dec. 18, 2003

(86) PCT No.: PCT/EP03/14547

§ 371 (c)(1),
(2), (4) Date: Dec. 28, 2006

(87) PCT Pub. No.: WO2004/056555

PCT Pub. Date: Jul. 8, 2004

(65) Prior Publication Data

US 2007/0150086 A1   Jun. 28, 2007

(30) Foreign Application Priority Data

Dec. 19, 2002   (GB) .................. 0229577.2

(51) Int. Cl.
*G06F 19/00* (2006.01)
(52) U.S. Cl. ...................... 700/115
(58) Field of Classification Search ............... 700/115, 700/117, 197
See application file for complete search history.

(56) References Cited

U.S. PATENT DOCUMENTS

| 5,116,112 | A  | * | 5/1992  | Rawlings ............... 351/162 |
| 6,609,041 | B1 | * | 8/2003  | Sanka et al. ........... 700/115 |
| 6,811,259 | B2 | * | 11/2004 | Tucker ................. 351/177 |
| 6,834,955 | B2 | * | 12/2004 | Doshi .................. 351/162 |
| 6,902,274 | B2 | * | 6/2005  | Tucker ................. 351/177 |

* cited by examiner

*Primary Examiner*—Leo Picard
*Assistant Examiner*—Chad Rapp
(74) *Attorney, Agent, or Firm*—Glenn D. Smith; Joseph Barrera; John E. Thomas

(57) ABSTRACT

A method for tracking multiple SKUs of contact lenses in a manufacturing line comprising the steps of: a) molding a plurality of contact lenses, b) providing a plurality of carriers each having a carrier indicator, c) inspecting each contact lens to determine information relating to its prescription, d) transferring each lens to a carrier, e) reading the carrier indicator of the carrier of step d) and f) storing in machine-accessible memory the information associated with the carrier indicator of the carrier of step (e) and the information relating to the lens for step (c).

14 Claims, 1 Drawing Sheet

CONTACT LENS MANUFACTURE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK

Not Applicable

BACKGROUND OF THE INVENTION

1. Field of the Invention

This invention relates to contact lens manufacturing and in particular to a method for tracking contact lenses through a manufacturing line so that multiple stock keeping units (SKU) can be simultaneously fabricated on the same manufacturing line.

In known automated contact lens production processes a contact lens is formed by sandwiching a reaction mixture between two mold sections having respective concave and convex optical surfaces which define the lens. The reaction mixture is dispensed into the concave surface which forms the front curve of the lens and the second mold section is seated on the first mold section such that the convex surface which forms the back curve of the lens is placed over the concave surface to define a mold cavity between the concave and convex surfaces. The reaction mixture within the assembled mold is subject to a curing cycle which polymerises the monomer inside the mold cavity. Typical contact lens curing methods include UV radiation and/or thermal curing. Once the curing is complete, the mold sections are separated to reveal the lens which has formed therein.

The lens must pass through a series of further processing stages such as inspection, hydration, primary packaging, labelling, and secondary packaging in which multiple primary packages are housed in a box or carton each having one or more labels to identify its contents.

One type of contact lenses is commonly referred to as "spherical contact lenses", i.e., contact lenses designed to provide a spherical optical correction (or "power") to compensate for myopia (nearsightedness) or hypermetropia (farsightedness). Such contact lenses are also designed with fitting parameters, especially lens diameter and effective base curve. Accordingly, a prescription for a spherical contact lens will typically specify spherical correction (power), lens diameter and base curve. Using hydrogel lenses as an example, manufacturers typically market series of spherical hydrogel contact lenses, each series including lenses having common fitting parameters and offering powers in 0.25 or 0.50 diopter increments.

In addition to spherical lenses, there are contact lenses commonly referred to as "toric contact lenses", i.e. contact lenses having a toric optical zone that are designed to correct refractive abnormalities of the eye associated with astigmatism. The toric optical zone provides cylindrical correction to compensate for the astigmatism, with the cylindrical correction commonly referred to as "cylindrical power". The toric surface may be formed in either the posterior lens surface (back surface toric lens) or in the anterior lens surface (front surface toric lens). Whereas spherical contact lenses may freely rotate on the eye, toric contact lenses have some type of ballast to inhibit rotation of the lens on the eye is inhibited so that the cylindrical axis of the toric zone remains generally aligned with the axis of the astigmatism. For example, one or more sections of the lens periphery may be thicker (or thinner) than other sections to provide the ballast. Toric contact lenses are manufactured with a selected relationship (or offset) between the cylindrical axis of the toric optical zone and the orientation of the ballast. This relationship is expressed as the number of degrees (or rotational angle) that the cylindrical axis is offset from the orientation axis of the ballast; toric contact lens prescriptions specify this offset, with toric lenses generally being offered in 5 or 10-degree increments ranging from 0° to 180°.

Since astigmatism requiring vision correction is usually associated with other refractive abnormalities, such as nearsightedness or farsightedness, toric contact lenses are generally prescribed, in addition to cylindrical power and axes offset, with a spherical correction and fitting parameters as for the aforementioned spherical contact lenses. Accordingly, a prescription for toric contact lens will typically specify spherical correction (power), lens diameter, base curve, cylindrical correction, and axes offset. It will be appreciated that for each power of lens a manufacturer may offer a series of 36 lenses having different spherical correction. However, there may not be a need for a great number of any given lens configuration.

In the past many contact lens fabrication and packaging lines have been configured to produce one SKU of lenses at a time, each lens having the same predetermined optical characteristic, for example, all the lenses are +1 spherical power. As a result, a limited number of stocking units (SKUs) were produced in large SKU sizes. Changing production to a different SKU has required cleaning out the manufacturing line, and changing the molds. Changing the molds that are used in such systems have been attendant with machine downtime.

2. Description of Related Art

EP-A-1052084 addresses the need for greater numbers of SKUs in smaller SKUs by fabricating multiple, different SKUs without requiring that the manufacturing line be shut down and cleaned out, and avoids cross-contamination of the different SKUs.

It proposes a method for tracking multiple SKUs of ophthalmic devices in a manufacturing line, comprising the steps of:

assembling first molding devices at least one of said first molding devices having an identification means;

reading said identification means of said at least one of said first molding devices;

forming first molded parts using said first molding devices;

providing a plurality of carriers, said carriers having carrier indicators;

transferring said first molded parts to at least one of said plurality of carriers;

reading said carrier indicator of said at least one of said plurality of carriers carrying said first molded parts; and storing in machine-accessible memory the information associated with said identification means of said at least one of said first molding devices and the information associated with said carrier indicator carrying said first molded parts. An apparatus for implementing the method is also disclosed.

While the proposed system is capable of tracking multiple SKUs, it relies upon placing the molding devices in carriers which carry them through the production line. This is not always desirable since conveying systems are capable of transporting assembled molds individually through and between manufacturing stages. Furthermore, in the cases of toric lenses the same mold pairs may be capable of producing a range of lenses of the same power having different spherical correction. Thus, identity of the mold pair is not sufficient to characterise the whole prescription and knowledge of the orientation of the mold halves relative to each other is required.

BRIEF SUMMARY OF THE INVENTION

The invention has been made with the above points in mind.

According to the present invention there is provided a method for tracking multiple SKUs of contact lenses in a manufacturing line comprising the steps of:

a) molding a plurality of contact lenses, b) providing a plurality of carriers each having a carrier indicator, c) inspecting each contact lens to determine information relating to its prescription, d) transferring each lens to a carrier, e) reading the carrier indicator of the carrier of step d) and f) storing in machine-accessible memory the information associated with the carrier indicator of the carrier of step (e) and the information relating to the lens from step (c).

DETAILED DESCRIPTION OF THE INVENTION

The invention provides a positive method of identifying a contact lens after it has been molded and associates that lens with the identity of a carrier which conveys the lens further down the manufacturing line. Thus, the process does not rely upon the identification of the molding devices to identify and subsequently track a lens and it is not necessary for the molding devices to be associated with a carrier. Furthermore, the inspection stage of each contact lens may assess the quality of the lens as well as determining information relating to its prescription and so a lens which is found to have a flaw may be discarded and need not pass further down the manufacturing line. The lens inspection may conveniently take place after release of the lens from the mold before any hydration stage.

The inspection of the lens to determine information relating to its prescription provides a reliable means of determining the end of one SKU and the beginning of another. The information relating to the lens prescription may be compared with the information stored in a production database to confirm the lens is part of a particular SKU. When a lens is found to be different from the preceding lens or current SKU the production database is interrogated to determine whether the lens is in accordance with the next SKU. The inspection and interrogation may be conducted automatically and a safe guard may be built in whereby the system must detect two or more identical lenses to confirm the start of a new SKU. If lenses do not meet this requirement they will be discarded. The system ensures that lenses from two different SKUs will not be placed on the same carrier. The system can cause one or more empty carriers to be conveyed through the manufacturing line when ever there is a change in SKU to provide a visual indication of the end of one SKU and the beginning of another.

The lens inspection system may measure the optical parameters of the contact lens or may read indicia and/or take measurements on identifiable marks which are molded in to the lens.

For example, the inspection may comprise identifying the optical correction of the lens by providing a first identifiable marking on a posterior surface of the lens and providing a second identifiable marking different from the first marking on an anterior surface of the lens; assigning combinations of first and second markings to optical correction values such that each unique combination of first and second markings is assigned to a unique optical correction value, and storing the assigned combinations and optical correction values in a database, reading the first and second markings and determining the optical correction of the lens by comparing the read of the first and second markings with the database of combinations of markings and assigned optical correction values.

In the case of a toric lens including a toric zone having a cylindrical axis and a ballast having a ballast axis, a third identifiable marking on the surface of the lens that is aligned with the cylindrical axis and a fourth identifiable marking on the surface of the lens that is aligned with the ballast axis is provided and the relationship between the third and fourth markings may be used to determine the cylindrical axis offset from the ballast axis.

Examples of lenses having such identifiable markings are disclosed in EP-B-975070.

The process for manufacturing contact lenses is controlled by a computer for the manufacturing line. The computer comprises a database of the details for each SKU refers to a batch of identical lenses i.e. having the same powers and cylinders and axis values. A different SKU will have a different combination of power, cylinder and axis values and will involve the use of a different anterior or posterior mold or a different orientation of the molds or the use of a different reactive mixture within the molds.

To begin a manufacturing run of an SKU the operator interrogates the computer to determine the identity of the SKU (lot number), the number of lenses to be made, the identification of the anterior and posterior molds, the orientation to which the molds must be assembled and the reactive mixture which is to be used. The containers for the mold parts and reactive mixture may conveniently possess identification means, such as a bar code or the like and may be scanned by the machine operator and cross-checked against the computer database to ensure the details are correct.

The mold sections are typically made by injection molding using a plastics such as polypropylene, polystyrene or polyvinyl chloride. They are generally only used once to use a single lens due to degradation of the optical surfaces thereof after molding a lens therein. The anterior mold having a concave surface is generally positioned with the concave surface in the horizontal plane and a quantity of the lens forming reactive material is dispensed in to the mold. The posterior mold section having a convex optical surface is seated upon the anterior mold section to define a lens-shaped mold cavity defined by the facing optical mold surfaces. The quantity of monomer dispensed is sufficient to permit a slight overflow of monomer upon seating the posterior mold section which ensures a complete fill of the cavity to the periphery where the lens edge will form. Upon fully seating the posterior mold section on the anterior mold section, the excess monomer flows radially outwardly of the mold cavity. Upon curing, the excess forms an annular flash ring commonly referred to as a monomer ring or reservoir. In the case of a toric lens the relative orientation of the posterior and anterior sections are critical.

One the mold unit has been assembled it is subjected to a curing cycle which polymerises the monomer inside the mold cavity. Typical contact lens curing methods include UV radiation and/or thermal e.g. oven, curing.

A plurality of the mold sections may be placed in a carrier before or after casting a mold assembly. The carriers may be used to transport arrays of molds to the subsequent manufacturing states. The carriers may comprise indication means which may be read and stored in the computer to assist in identifying an SKU.

However, it is not essential that a plurality of mold sections are placed on carriers and the individual assembled mold units may be conveyed in sequence to subsequent manufacturing stations on a conveyor system.

Once curing is complete, the posterior mold section is separated from the anterior mold section to reveal the lens formed therein. The mold release process must break the adhesive bond between the mold sections, yet not damage the lens which remains on one of the mold surfaces. In a preferred embodiment the lens remains upon the anterior concave optical surface at mold release and the annular lens flash remains or reservoir with the associated posterior mold section. The manufacturing line may comprise a reservoir removal station to ensure the lens flash or reservoir is removed from the anterior mold section. The removal station may conveniently comprise a knife blade which strips the annular lens flash or reservoir from the top of the mold section. Thus, immediately following mold release, the lens remains bonded to the concave mold surface and it is in the dry, rigid state.

The lenses are removed from the anterior mold section by a pick-and-place mechanism. It is at this stage in the manufacturing process that the lens may be conveniently inspected to determine information relating to its prescription.

A suitable inspection assembly includes a pick-and-place vacuum head having a vacuum source connected thereto and inspection optics. The inspection system preferably uses a source of structured light which is directed at the full periphery of the lens edge. As such, the structured light travels through the lens in the same manner as a fibre optic conduit wherein the light is totally internally reflected by the lens, finally exiting the lens at the edge thereof directly opposite the point of light entry. As such, defect-free areas of the lens appear as extremely low contrast areas on the image detector. Conversely, defects or markings in the lens cause the internally reflected light to scatter, thereby exiting the lens at the surfaced corresponding to the location of the defect or marking and causing a bright, high contrast area spot on the image detector. The inspection device may comprise a CCD camera. The camera and associated software may detect defects on the lens and also information relating to its prescription. The camera may read identification marks cast into the lens by the molds and/or make optical reading son the lens. For example, the system may read the identification marks of the anterior and posterior molds, measure the lens axis and toric angle. The information may be checked with the computer database to ensure the lens is in accordance with the SKU.

If a lens fails the inspection test the pick-and-place mechanism will deposit it in a reject bin. If the lens passes the inspection test the pick-and-place mechanism deposits the lens in a carrier. The carrier comprises a carrier indicator which is read and the information associated with the prescription lens and the information associated with the carrier indicator is stored on the computer thereby enabling the lenses to be tracked through subsequent manufacturing stages by detecting the carrier indicator. The carrier indicator may take the form of a uniquely assigned number, bar code, or code on a radio frequency chip etc.

After the inspection stage, the lenses proceed to a washing and/or hydration stage depending upon the type of lens. The carrier may support a plurality of lenses in separate compartments e.g. 16, 32 etc. and each lens is washed with purified water or in the case of hydrogel lenses hydrated with purified water until it has expanded to its full dimensions. The water is extracted from the compartments and fresh water added to rinse the lenses. The lenses may be subjected to several rinses by extraction and addition of purified water. Preferably a check is made to ensure the presence of a lens in a compartment after each extraction of water.

After hydration and washing the lenses are subjected to a packaging stage. The carrier itself may form part of the packing or the lenses may be transferred from the carrier into packaging containers e.g. blisters or other lens holders. Lenses intended for single day use are often packaged in blister packs containing a plurality of lenses e.g. a 5×3 array, each lens having its own blister or container. Lenses for longer use may be packaged in separate containers.

The carrier indicator is used to keep track of the lenses of an SKU. If the lenses are transferred from the carrier into containers or blisters for final packaging the identify of the lenses is monitored via the carrier indicator. For example, the carrier identifier may be scanned as the carrier enters a processing station which will trigger the computer to provide the necessary information for printing a label or information directly on the lid stock which is applied to feel the blisters or containers. In general, the blisters or containers are sealed by applying a lid stock which is heat sealed to the perimeter of the blister or container. Suitable lid stock comprises a laminate of metal foil on a polypropylene film. The lid stock may be printed e.g. by laser etching before or after its application to the container or blister. Alternatively, a label may be printed and applied to the lid stock before or after its application. The information printed on the lid stock or label may provide information for use by the end user or may be a machine readable identifier e.g. bar code, matrix code etc. to be used in later packaging operations. The labelling will provide sufficient information such that the lens in each blister or container may be identified in terms of its prescription and SKU, if necessary by interrogating the computer database. Thus, product integrity is ensured from inspection of the individual lens to its packaging in the blister or container.

Prior to application of the lid stock each blister or container is checked for the presence of a lens. After application of the lid stock the container or blister is examined for leaks and bad seals.

Thereafter, the packaged lenses are subjected to sterilisation. The blisters or containers may be transferred to a tray or carrier for passage through the sterilisation stage. The carrier is provided with a carrier indicator which is read and the information recorded in the computer memory so that the identity of the lenses and SKU is associated with the carrier indicator information.

After sterilisation the lenses may be stored in a warehouse and cartoned and labelled in response to a specific order. Alternatively, the lenses may be cartoned and labelled to fulfil an order or for stock-piling ready for future orders.

BRIEF DESCRIPTION OF THE SEVERAL VIEWS OF THE DRAWING(S)

The invention will now be described with reference to the accompanying drawings in which.

Figure 1:
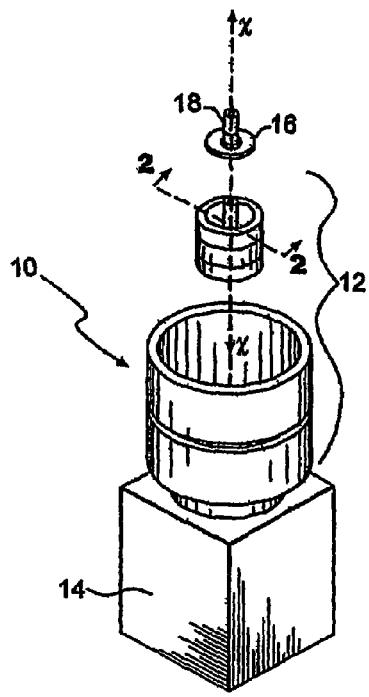
FIG. 1 is a perspective view of an inspection assembly suitable for use in the present invention with certain parts of the lighting module not shown for clarity.
Figure 2:
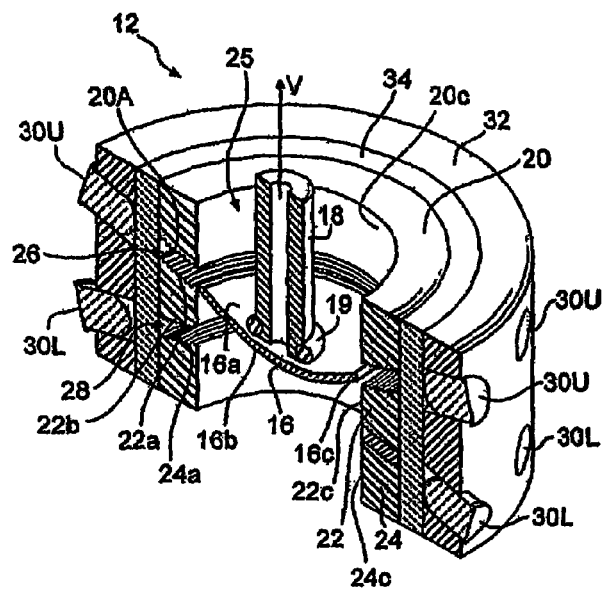
FIG. 2 is a cross-section perspective view of the lighting module as taken generally along the line 2-2 of FIG. 1 (the parts of the lighting module which are not shown in FIG. 1 are shown in FIG. 2)
Figure 3:
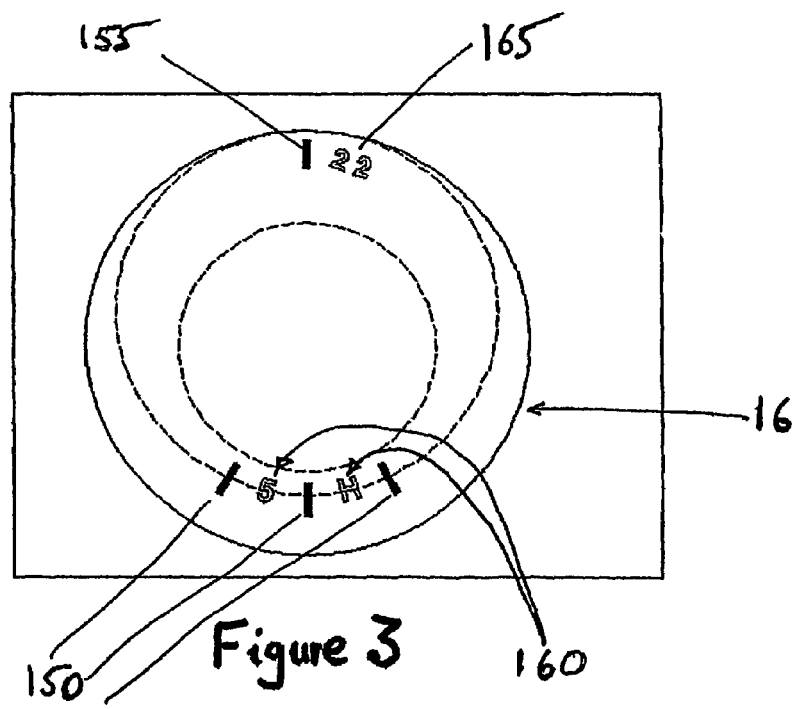
FIG. 3 represents an enlarged view of a contact lens in place on the inspection system.

FIGS. 1 and 2 show a lens inspection system designated generally by the reference numeral 10 having a lighting module 12 and an image pick-up device 14. As discussed in detail below, lens inspection system 10 is able to detect markings or defects (hereinafter collectively referred to as "markings") in a contact lens 16. It is furthermore noted that the word "markings" as used herein includes any type of mark on the lens under inspection, whether intentionally placed or not. Examples of intentionally placed markings include toric or rotational markings, inversion indicators, manufacturer's identifying marks, etc.

In a preferred arrangement of inspection system components, lighting module 12 is positioned above the imaging device 14 (e.g., a CCD camera) in a substantially vertically spaced relationship as seen in FIG. 1, although other component arrangements may be used as desired. The basic operation of inspecting system 10 involves:

(1) picking a lens 16 with a holder such as a pick-and-place vacuum head 18;

(2) positioning the lens 16 while attached to the head 18 inside the lighting module 12; and (3) activating the light source within the lighting module 12 with the imaging device directed at the lens.

As explained more fully below, markings and defects in the lens will show up as bright spots by imaging device 14. A computer (not shown) may be used in conjunction with inspection assembly 10 to interpret the markings read from the lens and to calculate a fail or pass condition based on predetermined threshold values which are compared with the measured image data received from the imaging device 14.

As seen in FIG. 2, lighting module 12 is of a generally circular configuration having upper, middle and lower aperture blocks 20, 22 and 24, respectively, which define a central opening 25. The upper and middle aperture blocks 20 and 22 are spaced from each other to define an upper light structuring aperture 26, and the middle and lower aperture blocks are spaced from each other to define a lower light structuring aperture 28, with the upper and lower light structuring apertures 26 and 28 each extending a full 360° about central opening 25. In this regard, it is noted that, depending on the intensity of the lighting source used, upper light structuring aperture 26 may alone be sufficient to achieve a sufficient inspection of the lens 16, in which case lower light structuring aperture 28 would not be necessary.

As seen best in FIG. 2, the facing surfaces 20a and 22a of the upper and middle aperture blocks 20 and 22, respectively, are textured with a series of parallel grooves which function to eliminate light rays which are not at the correct angle for lens inspection, as will be discussed further below. Likewise, facing surfaces 22b and 24a of the middle and lower aperture blocks 24 and 26, respectively, are textured for the same reason, i.e., to eliminate light rays which are not at the correct angle for lens inspection. Also, although not shown in FIG. 2, the inner cylindrical walls 22c, 24c and 26c of the upper, middle and lower aperture blocks, respectively, may be provided with texturing to eliminate glare off these surfaces. Further discussion of the individual functionality of the upper and lower light structuring apertures 26 and 28 is provided below.

Discussion is directed first to the functionality of the upper light structuring aperture 26. A light source is provided to deliver light about the full 360° perimeter of the upper and middle aperture blocks 20 and 22 whereby the upper aperture 26 acts to structure the light which is directed into central opening 25. In the embodiment of FIGS. 1 and 2, the light source is in the form of a plurality of annularly spaced LEDs 30U arranged in an outer ring 32 about upper aperture 26, although it is understood that any suitable light source may be used. Other types of suitable light sources include incandescent light bulbs and a 360° fibre optic light source, for example.

A light diffuser 34 is provided between LEDs 30U and light structuring aperture 26 which acts to substantially evenly diffuse the light emitted by the LEDs (or other light source) prior to the light being structured as it passes through aperture 26 into central opening 25. Light diffuser 32 is formed as a ring in the embodiment of FIGS. 1 and 2 although other configurations are possible. A material from which diffuser 32 may be formed is a clear plastic such as acrylic, for example.

Lens 16 may be held by a pick-and-place head 18 which engages the lens by drawing a vacuum "V". A soft O-ring 19 may be attached to the lens-engaging end of the head 18 so as to prevent damage to the delicate lens 16. It is preferred that head 18 pick lens 16 by engaging the concave side of the lens 16a whereupon lens 16 will be introduced into central opening 25 in a concave side-up position. Head 18 is movable along a vertical axis x-x (FIG. 1) between a raised position seen in FIG. 1, and a lowered position seen in FIG. 2. Thus, a lens 16 which has been engaged by head 18 is lowered into central opening 25 of the lighting module 12 and is positioned for inspection as seen in FIGS. 2 and 8a. When in the "inspection position", the outside, peripheral edge 16c of lens 16 is positioned along the path of incoming structured light rays from upper light structuring aperture 26.

Once a lens 16 is in the inspection position as described above, the light source is activated which delivers structured light through aperture 26 in the manner described above. The structured light strikes outside edge 16c of the lens 16 whereby the lens behaves in the same manner as a fibre optic conduit, i.e., light from aperture 26 is directed at and enters the lens at the peripheral edge 16c thereof and internally reflects off the inside of the opposite concave and convex lens surfaces 16a and 16b before finally exiting at the edge of the lens opposite the point of the applicable light ray entry. In this regard the facing surfaces 20a and 22a of the upper and middle aperture blocks 20 and 22, respectively, are beveled to angle downwardly such that the direction of light rays directed therethrough are oriented to impinge the edge 16c of the contact lens 16 in the direction of the lens curvature. In a preferred embodiment, bevel angle is between about 10° to 50°. Thus, light rays that pass substantially parallel to the angle of aperture 26 are the "structured light rays" referred to herein. Light rays not at this structured angle are stopped by the texturing provided on the aperture block surfaces 20a and 22a.

The underlying principals are the same principals of physics that make a fibre-optic cable work. In the case of a lens with no markings or defects a light ray enters the edge of the lens 16c, and the difference in density between the lens material and the surrounding air is large; therefore, the laws of refraction are at work. The principal of refraction prevents the light ray from refracting through the surface of the contact lens and escaping into the surrounding air. This is because the angle between the light ray and the surface of the lens material does exceed the critical angle for reflection. The light ray is instead reflected back inside the contact lens material. The light ray is then reflected off the opposite internal lens surfaces 16a and 16b. The angle of reflection will equal the angle of incidence. All light reflects back and forth between the anterior and posterior surfaces 16a and 16b of the contact lens until it exits at the opposite edge (not shown). The camera 14 sees no light; therefore, clear areas of the contact lens appear dark in the image.

While clear areas of the lens appear dark, the peripheral edge 16c of the lens appears bright. This is because at the edge of the lens 16", the lens surface geometry causes both reflection and refraction of light in the direction of the camera 14.

In the case of a lens having markings or defects the internally reflected light ray exits the lens at the point of defect/marking. The light scatters since it is reflected by the reflective surfaces present in the marking and also refracted due to the difference in density between the lens material and the marking. As such, the "not clear" areas of the lens where there are markings on the lens will appear as bright spots to imaging device 14 whereas the "clear" areas where there are no defects/imprints will appear dark.

This method of lens imaging for inspection is far superior at revealing the "not clear" areas of the lens than are the prior art inspection methods which direct light through the lens from the concave to the convex surfaces thereof. In the prior art methods, light passes completely through the lens at the clear areas of the lens while the marking areas of the lens block the light and thus appear dark. As such, many markings do not appear on the imaging device due to being "overwhelmed" by the light passing through the "clear" areas of the lens, thereby leading to difficulties in reading markings. Once the lens 16 has been imaged by imaging device 14, the light source may be deactivated until the next lens is in the inspection position. Alternatively, the light source may remain activated between lens inspections, as desired.

As mentioned above, the upper light structuring aperture 26 may alone be sufficient to adequately image and inspect the lenses; however, due to the presence of the pick-and-place head 18 at the centre of the lens 16, the area of the lens "inside" the o-ring 19 may be blocked from being able to give an accurate representation of markings in this area. In such a case, lower light structuring aperture 28 is used immediately following imaging of the lens at upper light structuring aperture 26.

More particularly, once lens 16 has been imaged at upper aperture 26, the upper LED array 30U is deactivated. With the central part of the lens convex side 16b aligned with lower light structuring aperture 28, lower LED array 30L is activated which directs light through diffuser 34 and through lower light aperture 28. If necessary, pick-and-place head 18 may be re-positioned within central opening 25 until the lens is in the right position. The facing surfaces 22b and 24a of the middle and lower aperture blocks are also beveled to angle upwardly to direct light toward the convex surface of the lens 16b which illuminates the area of the lens inside O-ring 19, thereby giving an image of this area of the lens to imaging device 14. This image is analysed along with the image received from upper aperture 26 by a computer (not shown) attached to inspection system 10 and provides information based on the results of the upper and lower aperture images.

In operation, pick-up head 18 which picks up a lens 16 may be provided on a travelling carriage assembly. For example, three pick-up heads may be provided so that while our pick-up head removes a lens from the mold, a second hold a lens over the camera and a third places a lens in a carrier. After imaging and inspecting lenses 16 the carriage assembly travels to the next station for release of the vacuum and lenses 16 into respective receptacles for further lens processing (e.g. hydration, extraction, packaging, etc.).

FIG. 2 shows the view from the camera in FIG. 1 on an enlarged scale. In the examples shown the lens is a toric lens having the following markings.

Ballast Alignment mark 150 appears as a set of three equally spaced radial lines separated from each other by 30° along the edge of the lens. These marks are molded into the convex surface of the lens, and also appear on the anterior mold. Each of the marks is 1.10 mm true height, 0.150 mm line width in size as etched on the anterior tool. The line drawn from the lens centre through the centroid of the middle alignment mark defines the ballast direction.

Toric Alignment mark 155 appears as a single radial line along the edge of the lens. With the ballast alignment mark positioned at the 6:00 position, the toric alignment mark can appear anywhere in the upper half of the clock face, from 9:00 through 3:00. This mark is molded into the concave surface of the lens, and is 1.10 mm true height, 0.150 mm line width in size as etched on the posterior tool. The line drawn from the lens (horizontal) centre through the centroid of this alignment mark defines the toric axis.

Anterior Mold Series mark 160 mark is a series of two α-numeric characters molded into the convex surface of the lens. The mark also appears on the anterior mold surface. The characters are approximately 0.75 mm true height, and will be located within 15° on either side of the central line in the ballast alignment mark. This mark uses a Helvetica 12 point font.

Posterior Mold Series mark 165 is a series of two numeric characters molded into the concave surface of the lens. The characters are approximately 0.75 mm true height, and will be located within 15° CW of the toric alignment mark. This mark also uses a Helvetica 12 point font.

The camera system records and measures these marks checking with the data on the computer to positively identify the lens and its prescription. Furthermore the camera will reveal any flaws such as tears, blemishes and other molding imperfections.

As each lens is inspected the information relating to the prescription is compared with the data associated with the particular SKU to ensure the lens is in accordance with the SKU. If the lens is correct it is placed into a carrier e.g. a tray having multiple compartments and the carrier identifier is scanned and the identify logged to associate the lens with the carrier. In the event the lens has imperfections, it is discarded. In the event the lens has a prescription which is not in accordance with the SKU, the information is compared with the next SKU. If the prescription data is consistent with the next SKU an end of SKU signal may be triggered. The carrier holding the last lens of the SKU is advanced and optionally one or more empty carriers may be advanced to provide a visual distinction between SKUs. Thereafter, the first lens of the new SKU is deposited in the carrier and the carrier indicator scanned and its identity logged to associate the carrier with the lens. In order to avoid the possibility of a rogue lens triggering an end of SKU, the inspection system may be controlled such that a number of consecutive lenses having identical prescription in accordance with the next SKU are examined before the end of SKU is triggered. The inspection system ensures that only lenses of identical prescription are placed on the same carrier and thus there can be no cross-contamination.

It will be appreciated that with toric lenses the same anterior and posterior molds may make a series of different lens prescriptions each having a different toric angle. A manufacturing run may comprise a "parent lot" which utilises the same anterior and posterior molds divided into a series of "child lots" which differ from one another by the toric angle. Preferably such "child lots" are scheduled such that there is at least a 30° difference in toric angle between one "child lot" and the next "child lot" in the sequence. This difference ensures that one "child lot" cannot be mistaken for another. However, the inspection system is sufficiently sensitive and accurate to positively determine consecutive lenses of the same power having a toric angle difference of 10° and so it is not essential that there is a 30° difference. However where a consecutive child lots or SKUs comprise lenses with similar prescription it is desirable that the inspection system is controlled such that at several e.g. consecutive lenses e.g. a difference of 10° or 20° in toric angle, having identical prescription must be measured to trigger the end of an SKU and start of the next SKU. In addition to the prescription information the lens inspection system may conduct a count of the lens having a particular prescription and compare that count with the information relating to the particular SKU and use the combined information to trigger an end of one SKU and beginning of the next SKU. In this way it is possible to distinguish between consecutive SKUs having identical lens prescription.

The invention claimed is:

1. A method for tracking multiple SKUs of contact lenses in a manufacturing line comprising the steps of:
  a) molding a plurality of contact lenses, having identifiable marks indicative of a prescription of a lens into the contact lenses and said identifiable marks are read during an inspection to determine information relating to the prescription of the lens,
  b) providing a plurality of carriers each having a carrier indicator,
  c) inspecting each contact lens to determine information relating to its prescription, wherein the lens is inspected by directing structured light at an entire 360° peripheral edge of the lens such that the structured light enters the lens at the peripheral edge thereof and internally reflects within the lens, and wherein the internally reflected light diffracts upon encountering a marking on the lens, whereby clear areas of the lens appear dark due to said internal light reflection, and one or more markings on the lens appear bright due to said internally reflected light scattering and exiting the lens at said one or more markings,
  d) transferring each lens to a carrier,
  e) reading the carrier indicator of the carrier of step d) and
  f) storing in machine-accessible memory the information associated with the carrier indicator of the carrier of step (e) and the information relating to the lens for step (c).

2. The method for tracking multiple SKUs as claimed in claim 1 in which each contact lens is inspected with a digital camera having associated image processing technology.

3. The method for tracking multiple SKUs as claimed in claim 1 in which the information relating to the lens prescription is compared to information stored in a production database to determine whether the lens meets the correct prescription for the current SKU.

4. The method for tracking multiple SKUs as claimed in claim 3 in which if the information relating to the prescription of the lens does not conform with the current SKU the information is compared against information in the production database relating to a next SKU.

5. The method for tracking multiple SKUs as claimed in claim 4 in which the inspection determines the lens is part of the next SKU and the start of the next SKU is triggered and the lens is transferred to a new carrier.

6. The method for tracking multiple SKUs as claimed in claim 4 or claim 5 in which the inspection system is adjusted to detect a plurality of consecutive lenses having an identical prescription before the next SKU is triggered.

7. The method for tracking multiple SKUs as claimed in claim 6 in which the inspection system is adjusted to detect at least 3 consecutive lenses having an identical prescription before the next SKU is triggered.

8. The method for tracking multiple SKUs as claimed in claim 4 in which the inspection system counts the number of consecutive lens of the same prescription and compares the count to information in the production database relating to the number of lens in the SKU to determine an end of the SKU.

9. The method for tracking multiple SKUs as claimed in any one of claim 4 in which at least one empty carrier is inserted between the carrier of one SKU and a carrier of the next SKU.

10. The method for tracking multiple SKUs as claimed in claim 1 in which the inspection additionally checks for flaws.

11. The method for tracking multiple SKUs as claimed in claim 1 in which if the information relating to the lens prescription is not in accordance with a current or next SKU and/or the inspection detects a flaw, the lens is transferred to a reject bin.

12. The method for tracking multiple SKUs as claimed in claim 1 in which the contact lenses are toric contact lenses.

13. The method for tracking multiple SKUs as claimed in claim 12 in which consecutive SKUs are toric contact lenses of the same power and have a difference in toric angle of at least 10°.

14. The method for tracking multiple SKUs as claimed in claim 12 in which consecutive SKUs are toric contact lenses of the same power and have a difference in toric angle of at least 30°.

* * * * *